Patented Dec. 9, 1924.

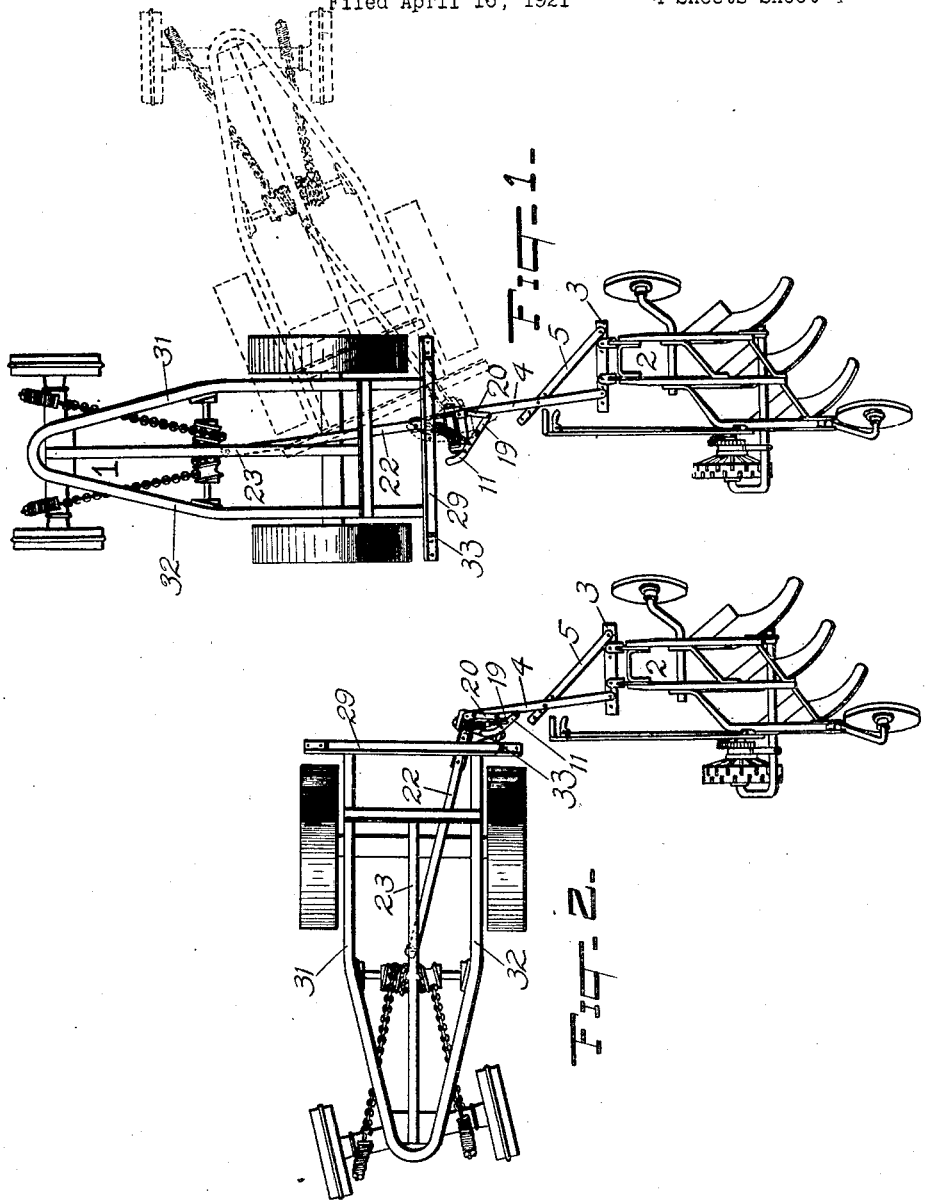

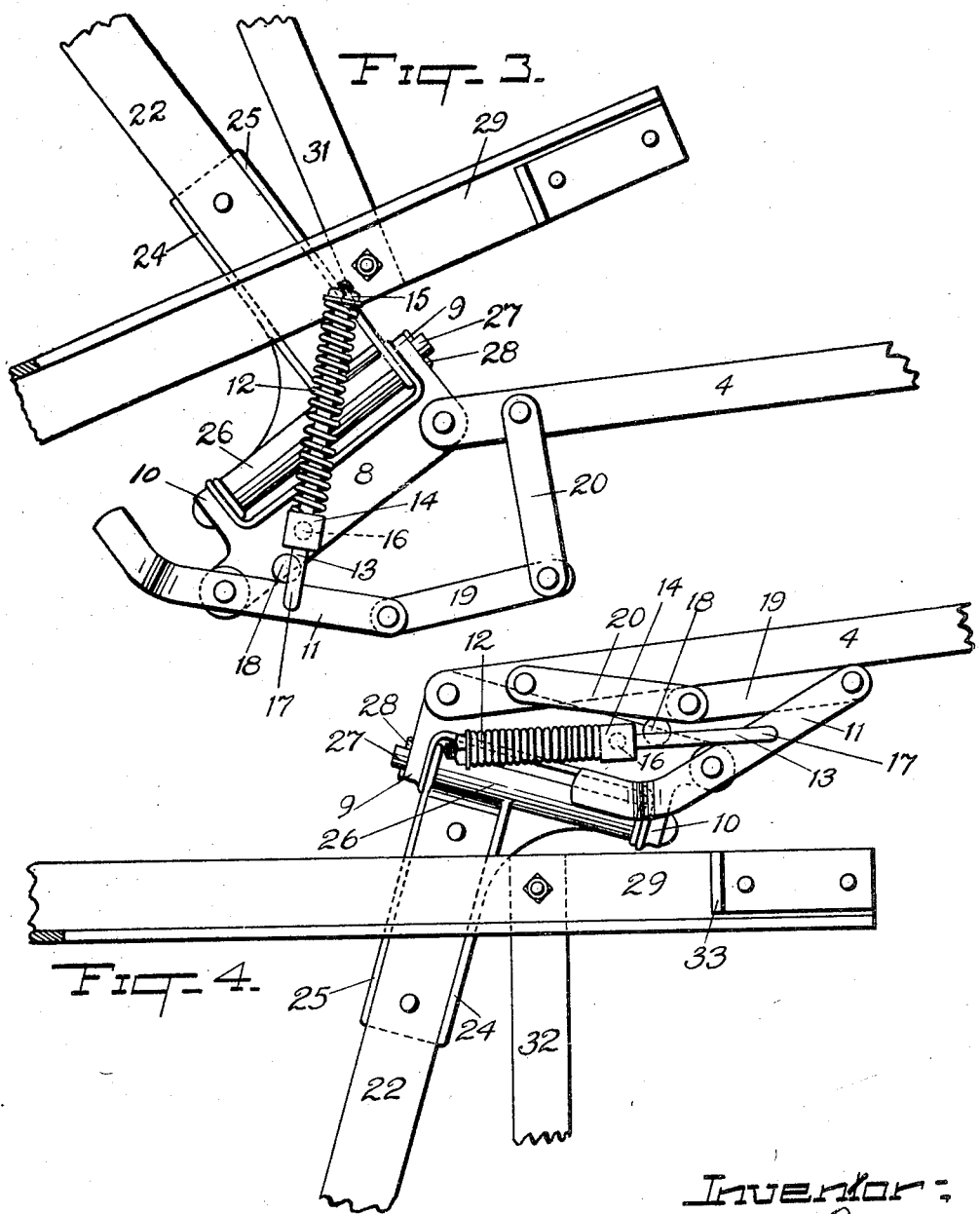

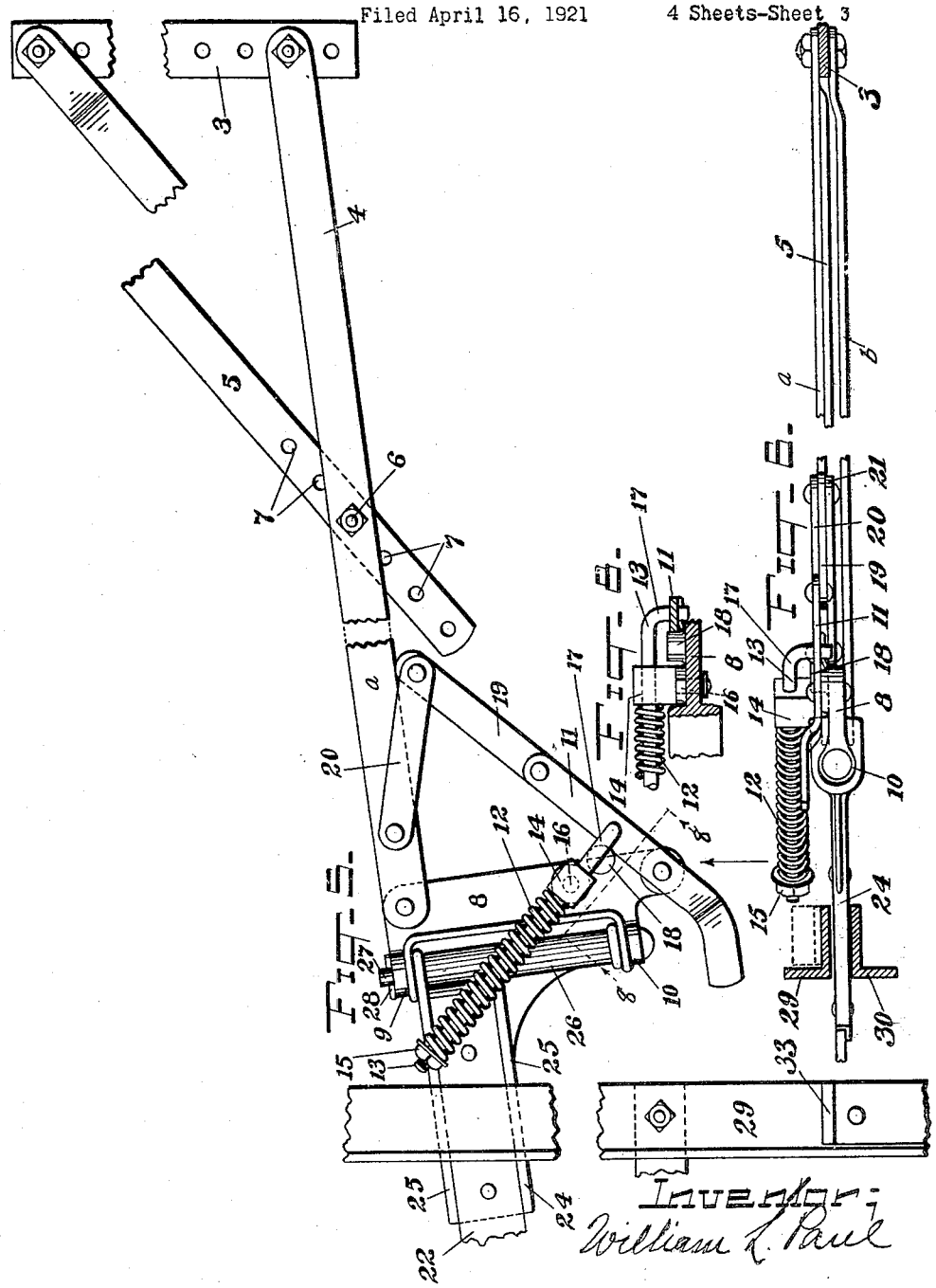

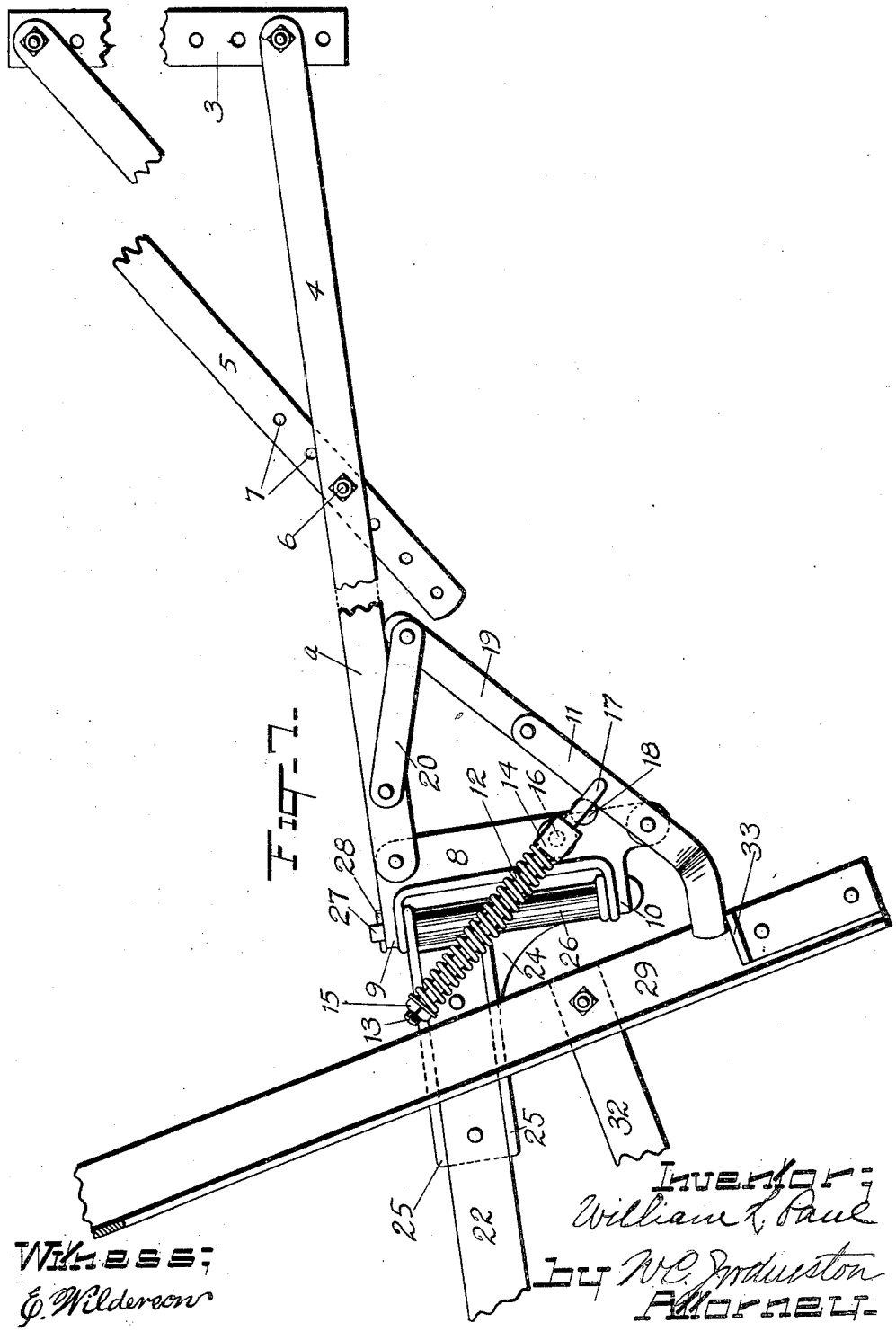

1,518,444

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

TRACTOR HITCH.

Application filed April 16, 1921. Serial No. 461,849.

*To all whom it may concern:*

Be it known that I, WILLIAM L. PAUL, a citizen of the United States, residing at Berkeley, in the county of Alameda and State of California, have invented certain new and useful Improvements in Tractor Hitches, of which the following is a specification, reference being had therein to the accompanying drawing.

My invention relates to hitch devices and more particularly to that type employed as a draft connection between tractors and agricultural machinery, and the object of my invention is to provide a hitch by which the object drawn, such as a plow, can be set to operate to the right or left of the tractor and preserve its line of work parallel to the line of travel of the tractor, and at the same time having it capable of turning freely to follow the tractor in a new direction.

Referring to the drawings in which similar numerals indicate identical parts—

Figure 1 is a plan view of a tractor and a plow connected together by my device, and showing also in dotted lines the tractor turning to the right.

Figure 2 is a plan view of a plow and tractor connected together by my device with the tractor turned to the left.

Figure 3 is an enlarged plan view of the hitch parts in position when the tractor is turning to the right as shown in dotted lines in Figure 1.

Figure 4 is an enlarged view of the hitch parts in the position shown in Figure 2.

Figure 5 is an enlarged plan view of the hitch parts as shown in position in full lines in Figure 1.

Figure 6 is a side elevation of Figure 5.

Figure 7 illustrates the position of the parts at the moment of tripping, and

Figure 8 is a sectional detail taken on the line 8—8 of Figure 5.

The tractor is designated by 1, sufficient of the machine being shown to illustrate the operation of my device. The type of gang plow 2 shown is well known in the art and comprises three plows suitably connected together to form a rigid structure. To the front of the plow frame is secured a drawbar 3 to the landward end of which is pivotally connected the rearward section 4 of a draft bar formed of two parallel bars $a$ and $b$, extending forwardly to pivotal connection with a part of my hitch mechanism. To the furrowward end of the drawbar 3 is pivotally connected a bar 5 extending forwardly and landwardly to the section 4 to which it is adjustably secured, between the bars $a$ and $b$, intermediate the ends of the section 4, by a bolt 6 which passes through a suitable hole in the section 4, and any one of a series of holes 7 in the bar 5, this series of holes being provided for the purpose of changing the angle of the draft connection of the tractor with the plow, as will be explained hereinafter.

The forward end of the section 4 is pivotally secured to the right end of a transversely disposed member 8, preferably a casting, which is provided with a bearing 9 at its right end, and a bearing 10 adjacent its left end, the left end being extended beyond the bearing 10 to form a support for a lever 11 which is pivotally mounted, intermediate its length, thereon.

The lever 11 extends rearwardly toward the section 4, and is normally held in this position by the expansive force of a coiled spring 12 which is mounted on a rod 13 longitudinally movable in a bearing in a block 14, the spring 12 being located between the block 14 and a nut 15 on the free end of the rod 13. The block 14 is pivotally mounted on the casting 8 by a short spindle 16, integral with the block and rotatably held in a bearing in the casting 8, as shown in dotted lines in Figure 7. The part 17 of the rod 13 extending rearwardly of the block 14 is bent downwardly and engages with a perforation in the lever 11 whereby the latter is held in contact with a stud 18 on the casting 8, this being its normal position when the tractor is traveling straight ahead. In alinement with the lever 11, and pivotally connected thereto is a link 19 extending to contact with the section 4 and pivotally connected to forwardly extending links 20 and 21 which are pivotally secured respectively to the bar $a$ on opposite sides thereof.

The forward section 22 of the draft bar is pivotally secured to the under central part of the tractor frame, in this instance a reach bar 23, and extends rearwardly substantially in line with the section 4 when the tractor and plow are moving straight ahead. The rear end of the section 22 is rigidly secured to a casting 24 between vertical flanges 25 thereon. The casting 24 has a laterally extending sleeve 26 which is in position between the bearings 9 and 10 and is held there by a bolt 27 which passes through both bearings and the sleeve and is secured by a cotter or pin 28. The forward part of the casting 24, to which the section 22 is secured, extends between transverse bars 29 and 30, forming the rear of the tractor frame and rigidly bolted to the side bars 31 and 32, the lower transverse bar 30 operating as a support for the hitch device which is free to move between the bars 29 and 30 when the direction of travel is changed.

As shown in full lines in Figure 1 the tractor and attached implement are traveling in straight lines, the tractor on hard ground, and the plow operating to the right of the longitudinal central line of the tractor, the furrowward plow body turning the soil outside of the plane of the right rear tractor wheel. If it is desired to change operation to the left the tractor is steered in that direction, the forward movement of the plow being very slight during the turn; during this part of the turn of the tractor, the sections 22 and 4 are rigid with each other operating as one bar swinging to the left; as the turn continues the free end of the lever 11 contacts with a trip stop 33 on the rear frame bar 29; the pressure of the trip stop 33 against the free end of the lever 12 breaks the alinement of the lever 11 and the link 19, this alinement, until it is thus broken, is maintained by the expansion of the spring 12 and the contact of the link 19 with the section 4 locking the sections 22 and 4 together so that they operate as one rigid bar when the tractor and plow are moving in a straight line, or until the connection holding the two in rigid alinement is broken, as described. When the lever 11 is tripped the continued turn of the tractor brings the frame bar 32 and the casting 24 into contact. When the tractor is headed in the desired direction and advances again in a straight line, the plow will gradually resume the position for which it has been set, as for instance, as shown in Figure 1, and the lever 11 and connected parts are again, as shown in Figures 1, 5 and 7, holding the sections 4 and 22 in rigid alinement until the lever 11 is again tripped by turning the tractor, the return of the plow to its following position being materially aided by the expansive force of the spring 12 operating to again aline the lever 11 and the link 19.

As explained the sections 4 and 22 are in rigid alinement when the tractor and plow are traveling in straight lines and in a turn to the left that alinement is broken by tripping the lever 11; in turning to the right, however, as the lever 11 and connected parts do not hold the sections 4 and 22 in alinement against such a turn, the sections 4 and 22 pivot freely upon each other and the mechanism is as shown in full and dotted lines in Figure 1, and in full lines in Figure 3. The plow can be operated further to the right, than is shown in the drawings, by removing the bolt 6, a slight forward movement of the tractor will then swing the plow to the right until either of the holes 7, toward the end of the bar 5, registers with the hole in the section 4, the bolt can then be inserted to hold the section 4 and bar 5 together, and when this is done the continued advance of the tractor will automatically return the plow to an operative position but further to the right of the tractor, the sections 4 and 22 being in line but at a greater angle to the line of draft, and it follows that the plow can be operated more to the left, than shown in the drawings, if the bar 5 is secured to the section 4 by the bolt 6 holding in holes in the bar 5 to the right of the section 4.

It will be readily understood that by reversing the position of the hitch parts, the bars 4 and 22 will pivot freely on each other on turning to the left and the mechanism will be in position opposite to that shown in Figure 1, and the lever 11 will be operated by contact with a stop toward the right to break the draft connection for a turn of the tractor and plow in that direction.

What I claim is:

1. The combination with a tractor, of a hitch mechanism connecting said tractor with an object to be drawn, said mechanism rigidly connected to said object and pivotally connected to the tractor and having a hinge joint intermediate its length whereby part of said mechanism is free to swing with a turn of the tractor in one direction, means to hold said part from a swinging movement in the opposite direction, and means to automatically release said part to follow the turn of the tractor in said opposite direction.

2. The combination with a tractor, of a hinge mechanism connecting said tractor with an object to be drawn, said mechanism rigidly connected to said object and pivotally connected to the tractor and having a hinge joint intermediate its length whereby part of said mechanism is free to swing with a turn of the tractor in one direction, means to hold said part for a predetermined distance from a swinging movement when the tractor turns in the opposite direction, and means to automatically release said part to follow the turn of the tractor in said opposite direction.

3. The combination with a tractor, of a hitch mechanism connecting the tractor with an object to be drawn, said mechanism rigidly connected to the object and pivotally connected to the tractor, a hinge included in said mechanism intermediate the length thereof and freely operative when the tractor turns in one direction, means to lock said hinge from operation in a turn of the tractor in the opposite direction, and means to automatically break said lock at a predetermined point in the turning movement of the tractor in said opposite direction.

4. The combination with a tractor, of a hitch mechanism connecting said tractor with an object to be drawn, said mechanism including a draft bar rigidly connected to said object and formed of two sections hingedly connected together one in advance of the other and pivotally secured to the tractor, the forward section swinging freely in a turn of the tractor in one direction, means to hold said section for a predetermined distance from a swinging movement when the tractor turns in the opposite direction, and means to automatically release said holding means when said distance is exceeded.

5. The combination with a tractor, of a hitch mechanism connecting said tractor with an object to be drawn, said mechanism including a draft bar rigidly and adjustably connected to said object and formed of two sections hingedly connected together, one in advance of the other and pivotally secured to the tractor, the forward section swinging freely in a turn of the tractor in one direction, means to hold said section for a predetermined distance from a swinging movement when the tractor turns in the opposite direction, and means to automatically trip said holding means when said distance is exceeded.

6. The combination with a tractor, of a hitch mechanism connecting said tractor with an object to be drawn, said mechanism including a draft bar rigidly connected to said object and formed of two sections hingedly connected together one in advance of the other, and pivotally secured to the tractor, the forward section swinging freely with the turn of the tractor in one direction, and means to hold the hinge connection rigid for a predetermined distance when the tractor turns in the opposite direction.

7. The combination with a tractor, of a hitch mechanism connecting said tractor with an object to be drawn, said mechanism including a draft bar rigidly connected to said object and formed in two sections hingedly connected together, one in advance of the other and pivotally secured to the tractor at a transverse central point thereon and intermediate the front and rear of the tractor, the forward section swinging freely with the turn of the tractor in one direction, means to hold the hinge connection rigid for a predetermined distance when the tractor turns in the opposite direction, and means to automatically cause said hinge to yield when said distance is exceeded.

8. The combination with a tractor, of a hitch mechanism connecting said tractor with an object to be drawn, said mechanism including a draft bar formed of two sections hingedly connected together one in advance of the other the rear section adjustably connected to said object and normally rigid therewith, the forward section pivotally connected to the tractor at a point in the longitudinal medial line thereof and free to swing with a turn of the tractor in one direction, means to hold said hinge connection rigid for a predetermined distance when the tractor turns in the opposite direction, and means to automatically cause said hinge connection to yield when said distance is exceeded.

9. The combination with a tractor, of a hitch mechanism connecting said tractor with an object to be drawn, said mechanism including a draft bar formed of two sections one in advance of the other, a hinge connecting the two sections and operable freely to permit the forward section to follow the turn of the tractor in one direction, means to lock said hinge to prevent free movement of the forward section in the opposite direction, and means on the tractor adapted to trip said locking means when said tractor has turned a predetermined distance in the opposite direction whereby said forward section is freed to follow the turn of the tractor.

10. The combination with a tractor, of a hitch mechanism connecting said tractor with an object to be drawn, said mechanism including a draft bar formed of two sections one in advance of the other, a hinge connecting said sections, the forward section free to swing with a turn of the tractor in one direction, a lever operating to hold the forward section from swinging in the opposite direction, and means on the tractor to trip the lever and release said section at a predetermined point in the turn of the tractor in the opposite direction.

WILLIAM L. PAUL.